Patented July 3, 1951

2,558,785

UNITED STATES PATENT OFFICE 2,558,785

20-CYANOPREGNENES AND PROCESS

Lewis Hastings Sarett, Princeton, N. J., assignor to Merck & Co., Inc., Rahway, N. J., a corporation of New Jersey No Drawing. Application February 18, 1949, Serial No. 77,268

16 Claims. (Cl. 260—397.4)

1

This invention is concerned generally with novel steroid compounds and with processes for preparing them. More particularly, it relates to $\Delta^{17}$-20-cyano-pregnene compounds, to processes for preparing these compounds from the corresponding 20-keto-pregnane compounds, and to the intermediate compounds thus obtained.

This application is a continuation-in-part of my co-pending application Serial No. 778,465, filed October 7, 1947, now Patent No. 2,541,105, which, in turn, is a continuation-in-part of my co-pending application Serial No. 773,525, filed September 11, 1947, now Patent No. 2,541,104.

The $\Delta^{17}$-20-cyano-pregnene compounds herein described can be converted to the corresponding 17($a$)-hydroxy-20-keto-pregnane compounds according to procedures outlined in this application and described in detail in said co-pending applications Serial Nos. 773,525 and 778,465, and in co-pending application Serial No. 71,046, filed January 14, 1949. The 17-hydroxy groupings in the compounds thus obtained have the same stereochemical configuration as that present in many of the naturally-occurring adrenal hormones. This is of special interest in the preparation of pregnene-4-diol-17($a$), 21-trione-3,11,20 (commonly known as Kendall's Compound E), and its 21-acyl derivatives. These compounds are important as adrenal hormones or in therapy requiring adrenal hormone type compounds. They are further useful in the synthesis of similar hormones and compounds.

According to the present invention, 20-keto-pregnane compounds are treated with hydrogen cyanide or one of its salts, and the cyanhydrin thus obtained is reacted with a dehydrating agent to produce the corresponding $\Delta^{17}$-20-cyano-pregnene compound. This compound can be converted to the corresponding 17($a$)-hydroxy-20-keto-pregnane compound by reacting the $\Delta^{17}$-20-cyano-pregnene compound with osmium tetroxide and reacting the intermediate osmate ester with a hydrolyzing agent. These reactions may be chemically represented as follows:

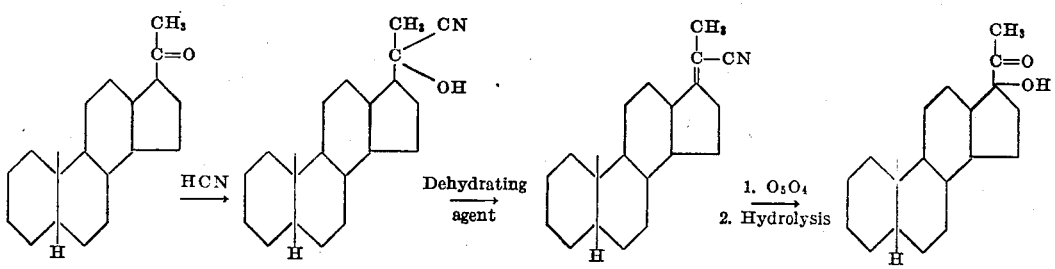

As noted above, the 17-hydroxy group, introduced according to this novel method, is obtained, surprisingly enough, in only one isomeric form, namely the "$a$" or "natural" configuration. For purposes of this application the configuration represented by the notation 17($a$)-hydroxy is to be understood to represent the configuration present in the naturally-occurring adrenal compounds.

The class of starting materials ordinarily utilized in practicing the present invention are 20-keto-pregnanes which contain free or esterified hydroxyl groupings in the molecule, and which may also contain a keto grouping in the 11-position of the perhydrophenanthrene nucleus. The hydroxyl or esterified hydroxyl radical may be attached to any of the carbon atoms of the perhydrophenanthrene nucleus or to the 21-carbon atom of the side chain. The substituent in the 17-position of these 20-keto-pregnane starting materials may thus be represented by the formula: $-CO-CH_2R$ wherein R is a radical of the class consisting of hydrogen, hydroxy and acyloxy radicals. The preferred starting materials are those which contain a 21-hydroxyl or 21-acyloxy radical since adrenal hormones, such as Compound E, contain a 21-hydroxyl substituent.

Examples of this class of starting materials are: 20-keto-pregnane, 3(a)-hydroxy-20-keto-pregnane, 3-acetoxy-20-keto-pregnane, 3(a)-hydroxy-11,20-diketo-pregnane, 3(a),21-dihydroxy-20-keto-pregnane, 3(a),21-diacetoxy-20-keto-pregnane, 3-actoxy-11,20-diketo-pregnane, 3-benzoxy-11,20-diketo-pregnane, 3,12-dihydroxy-20-keto-pregnane, 3,12,21-triacetoxy-20-keto-pregnane, 3(a),21-dihydroxy-20-keto-pregnane, 3(a),21-diacetoxy-20-keto-pregnane, 3(a),21-dihydroxy-11,20-diketo-pregnane, 3(a)-hydroxy-11,20-diketo-21-acetoxy-pregnane, 3(a),21-diacetoxy-11,20-diketo-pregnane, and the like.

In carrying out my improved process, I ordinarily react the 20-keto pregnane compound with hydrogen cyanide, or one of its salts, preferably in solution in a low aliphatic alcohol, thereby producing the corresponding cyanhydrin, the 20-hydroxy-20-cyano-pregnane compound. Free primary or secondary hydroxyl groupings in the molecule may be acylated prior to treating the compound with hydrogen cyanide, but this is not essential since the free hydroxyl radicals are not affected by this reaction.

Before reacting the C-20 cyanhydrin with a dehydrating agent, however, any free primary or secondary hydroxyl groupings should be protected as, for example, by conversion to the corresponding acyloxy radicals. This is accomplished by reacting said cyanhydrin with an acylating agent, such as a lower aliphatic acid anhydride. Alternatively, a secondary hydroxyl group may be protected by oxidation to a ketone, since the C-20 cyanhydrin is moderately stable to treatment with oxidizing agents. It is ordinarily preferred to conduct this oxidation reaction utilizing chromic acid as the oxidizing agent.

The dehydration reaction is best carried out by treating the 20-hydroxy-20-cyano-pregnane compound, after acylation or oxidation of any free hydroxyl groupings which may be present, with a dehydrating agent, such as phosphorus oxychloride, thereby producing the corresponding $\Delta^{17}$-20-cyano-pregnene compound. This reaction is ordinarily carried out in solution in a substantially anhydrous organic solvent, such as pyridine.

$\Delta^{17}$-20-cyano-pregnene compounds, which are obtained by reacting hydrogen cyanide with 20-keto-pregnane compounds of the class enumerated and reacting the intermediate cyanhydrin (after acylation of free primary and secondary hydroxyl groupings in the molecule) with a dehydrating agent, include: $\Delta^{17}$-20-cyano pregnene, $\Delta^{17}$-3(a)-acyloxy-20-cyano-pregnene, $\Delta^{17}$-3-acetoxy-20-cyano-pregnene, $\Delta^{17}$-3(a)-acyloxy-11-keto-20-cyano-pregnene, $\Delta^{17}$-3-(a),21-diacyloxy-20-cyano-pregnene, $\Delta^{17}$-3(a),21-diacetoxy-20-cyano-pregnene, $\Delta^{17}$-3-acetoxy-11-keto-20-cyano-pregnene, $\Delta^{17}$-3-benzoxy-11-keto-20-cyano-pregnene, $\Delta^{17}$-3,12-diacyloxy-20-cyano-pregnene, $\Delta^{17}$-3,12,21-triacetoxy-20-cyano-pregnene, $\Delta^{17}$-3(a),21-diacyloxy-11-keto-20-cyano-pregnene, $\Delta^{17}$-3(a),21-diacetoxy-11-keto-20-cyano-pregnene, and the like. These $\Delta^{17}$-20-cyano-pregnene compounds, containing one or more acyloxy substituents can be reacted with a hydrolyzing agent to form the corresponding hydroxy-substituted $\Delta^{17}$-20-cyano-pregnene compound.

When a $\Delta^{17}$-20-cyano-pregnene compound containing esterified hydroxyl substituents, such as the pregnene compounds enumerated above, is reacted with osmium tetroxide and the intermediate osmate ester is reacted with a hydrolyzing agent for a sufficient time to completely hydrolyze the ester linkages present in the molecule, the product obtained is the corresponding hydroxy-substituted-17(a)-hydroxy-20-keto-pregnane. In the preparation of adrenal hormones, such as compound E, it is ordinarily desired, however, to prepare 17(a)-hydroxy-20-keto-pregnane compounds containing keto substituents attached to the perhydrophenanthrene nucleus.

These keto-substituted 17(a)-hydroxy-20-keto-pregnane compounds can be obtained by reacting an intermediate 20-cyano-20-hydroxy-pregnane compound containing free secondary hydroxyl groupings with an oxidizing agent, and reacting the keto-substituted 20-cyano-20-hydroxy-pregnane compound, thus produced, with a dehydrating agent to form the corresponding keto-substituted $\Delta^{17}$-20-cyano-pregnene compound. Examples of these keto-substituted $\Delta^{17}$-20-cyano-pregnenes which can be prepared according to this procedure are: $\Delta^{17}$-3-keto-20-cyano-pregnene, $\Delta^{17}$-3,11-diketo-20-cyano-pregnene, $\Delta^{17}$-3,12-diketo-20-cyano-pregnene, $\Delta^{17}$-3,11-diketo-20-cyano-21-acetoxy-pregnene (obtained by treating 3-hydroxy-11,20-diketo-21-acetoxy-pregnane with hydrogen cyanide, reacting the cyanhydrin thus obtained with chromic acid, and treating the resulting 3,20-dihydroxy-11-keto-20-cyano-21-acetoxy-pregnane with phosphorus oxychloride), and the like.

When these keto-substituted-$\Delta^{17}$-20-cyano-pregnene compounds are reacted with osmium tetroxide followed by a hydrolyzing agent, there is obtained the corresponding keto-substituted-17(a)-hydroxy-20-keto-pregnane compound. This procedure is disclosed in detail in co-pending application Serial No. 778,465, filed October 7, 1947.

It is now preferred to prepare these keto-substituted-17(a)-hydroxy-20-keto-pregnane compounds by a novel process, disclosed in my co-pending application Serial No. 76,205, filed February 12, 1949, now Patent No. 2,541,106. In this process a $\Delta^{17}$-20-cyano-pregnene compound containing one or more nuclear hydroxyl groupings is reacted with osmium tetroxide to produce the 17,20-osmate ester of the corresponding nuclear hydroxylated - 17,20 - dihydroxy-20-cyano-pregnane compound. As disclosed in said co-pending application, 17,20-osmate esters of 17,20-dihydroxy-pregnanes having a cyano radical attached to the C-20 carbon atom are extremely stable to oxidizing agents. The 17,20-osmate esters of nuclear-hydroxylated 17,20-dihydroxy-20-cyano-pregnanes can therefore be reacted with oxidizing agents to produce the 17,20-osmate ester of the corresponding keto-substituted-17,20-dihydroxy-20-cyano-pregnane, which upon hydrolysis yields the desired keto-substituted-17(a)-hydroxy-20-keto-pregnane.

In preparing adrenal hormones, such as Compound E, the 20-keto-pregnane compounds used as starting materials ordinarily contain a 21-hydroxyl (or esterified hydroxyl) grouping and at least one nuclear hydroxy substituent. When these nuclear-hydroxylated 20-keto-21-hydroxy-pregnane compounds are treated with hydrogen cyanide, followed by protective acylation and reaction with a dehydrating agent, there are obtained as products the corresponding $\Delta^{17}$-20-cyano-21-acyloxy-pregnene compounds having at least one nuclear acyloxy substituent. It is ordinarily desired to convert the nuclear acyloxy substituents in these compounds to the corresponding hydroxy radicals, while retaining the acyloxy substituent in the 21-position, since these nuclear hydroxylated $\Delta^{17}$-20-cyano - 21 - acyloxy pregnenes can be converted, as described in the preceding paragraph, to the corresponding keto-substituted 17($\alpha$) - hydroxy - 20 - keto - pregnane compound.

I have discovered that $\Delta^{17}$-20-cyano-21-acyloxy-pregnenes containing nuclear acyloxy substitutents can be converted to said nuclear-hydroxylated $\Delta^{17}$-20-cyano-21-acyloxy-pregnenes as follows: The $\Delta^{17}$-20-cyano-21-acyloxy-pregnene compound containing a nuclear acyloxy substituent is reacted with a hydrolyzing agent to produce the corresponding nuclear-hydroxylated $\Delta^{17}$-20-cyano-21-hydroxy-pregnene, and this compound is reacted with one molecular equivalent of an acylating agent whereby the 21-hydroxyl grouping is preferentially acylated without affecting the nuclear hydroxyl radicals, thereby producing the corresponding nuclear-hydroxylated $\Delta^{17}$-20-cyano-21-acyloxy pregnene. Thus, when a $\Delta^{17}$-3,21- diacyloxy - 20 - cyano - pregnene compound is treated according to this procedure utilizing acetic anhydride as the acylating agent, the product is the corresponding $\Delta^{17}$-3-hydroxy-20-cyano-21-acetoxy - pregnene compound; for example, $\Delta^{17}$-3-($\alpha$), 21-diacetoxy-20-cyano-pregnene gives $\Delta^{17}$-3-($\alpha$)-hydroxy-20-cyano-21 - acetoxy-pregnene; $\Delta^{17}$-3,12,21-triacetoxy - 20 - cyano-pregnene gives $\Delta^{17}$ - 3,12 - dihydroxy - 20 - cyano-21 - acetoxy - pregnene; when $\Delta^{17}$ - 3($\alpha$),21 - diacyloxy - 11 - keto - 20 - cyano - pregnene is hydrolyzed and the hydrolysis product reacted with acetic anhydride, the product obtained is $\Delta^{17}$ - 3($\alpha$)-hydroxy-11-keto-20-cyano-21-acetoxy-pregnene. These nuclear-hydroxylated $\Delta^{17}$-20-cyano-21-acyloxy-pregnenes can then be treated with osmium tetroxide and the osmate ester reacted with an oxidizing agent whereby the free nuclear hydroxyl radicals are oxidized to keto groupings to produce the 17,20-osmate ester of the corresponding keto-substituted 17,20 - dihydroxy-20-cyano-21-acyloxy-pregnene; hydrolysis of this keto substituted osmate ester produces the corresponding keto-substituted 17($\alpha$) - 21 - dihydroxy-20-keto-pregnene.

From the foregoing, it will be noted that the preferred class of compounds embraced by the present invention are those $\Delta^{17}$-20-cyano-pregnenes having a 17-position substituent of the formula:=C(CN)CH$_2$R wherein R is a radical of the class consisting of hydrogen, hydroxy and acyloxy radicals, and having at least one nuclear substituent of the class consisting of keto, hydroxy and acyloxy radicals.

It is desired to emphasize, however, that all $\Delta^{17}$-pregnenes having a cyano substituent attached to the C-20 carbon atom possess the valuable and unexpected property (characteristic of the preferred class of compounds enumerated above) of yielding, upon reaction with osmium tetroxide followed by hydrolysis, a single isomeric form (the "$\alpha$" or "natural" modification) of the corresponding 17-hydroxy-20-keto-pregnane.

The following examples illustrate methods of carrying out the present invention, but it is to be understood that these examples are given by way of illustration and not of limitation.

*Example 1*

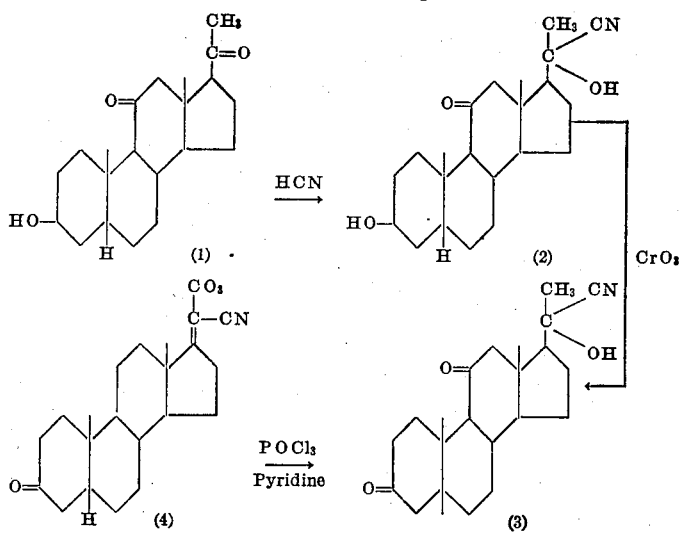

A solution of 1.80 g. of 3 ($\alpha$)-hydroxy-11,20-diketo-pregnane, (Compound 1 above), which can be prepared as described by Von Euw, Lardon and Reichstein in Helv. Chim. Acta 27, 821 (1944), in a mixture of 25 cc. of alcohol and 6.4 cc. of acetic acid at 0° C. is treated with 6.0 g. of potassium cyanide. The solution is allowed to warm to room temperature and after three hours is diluted with water and filtered. The wet crude cyanhydrin is dissolved in ethyl acetate and the extract washed with water. Crystallization then gives approximately 1.5 g. of 3($\alpha$),20-dihydroxy-20-cyano-11-keto-pregnane (Compound 2).

To a solution of 1.4 g. of 3($\alpha$),20-dihydroxy-20-cyano-11-keto-pregnane in 70 cc. of acetic acid is added at 16° C. a solution of 0.9 g. of chromic acid in 7 cc. of acetic acid. At the end of one hour, water is added, the crystalline precipitate filtered and recrystallized from ethyl acetate to produce approximately 0.93 g. of 3,11-diketo-20-hydroxy-20-cyano-pregnane (Compound 3), dec. 170–180° C.

About 0.60 cc. of phosphorus oxychloride is added to a solution containing 2.0 g. of 3,11-diketo-20-hydroxy-20-cyano-pregnane dissolved in 6.7 cc. of pyridine. After standing at room temperature for 24 hours, the solution is poured into water and dilute hydrochloric acid, extracted with benzene and concentrated to dryness. The crystalline residue consists of nitriles which may be separated chromatographically to produce approximately 300 mg. of $\Delta^{17}$-3,11-diketo-20-cyano-pregnene (Compound 4); M. P. 222–223° C.

dissolved in 3 cc. of pyridine. After standing at room temperature for 24 hours, the solution is poured into water and dilute hydrochloric acid, extracted with benzene and concentrated to dryness. The crude product, after chromatography

Example 2

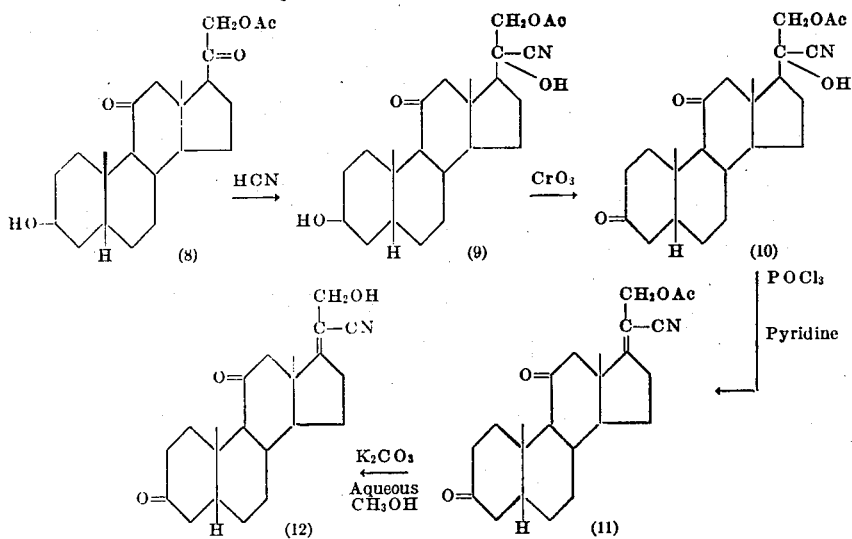

A solution of 2.0 g. of 3($\alpha$)-hydroxy-21-acetoxy-11,20-diketo-pregnane (Compound 8), which can be prepared as described by Von Euw, Lardon and Reichstein, Helv. Chim. Acta 27, 1287 (1944), is treated in a mixture of 25 cc. of alcohol and 6.4 cc. of acetic acid at 0° C. with 6.0 g. of potassium cyanide. The solution is allowed to warm to room temperature and after 3 hours is diluted with water. The addition of a large volume of water to the alcohol-hydrogen cyanide mixture precipitates a gum which is extracted with chloroform or ethyl acetate. The extract is washed with water, and evaporated to small volume under reduced pressure. The crystalline precipitate (1.3 g.) consists of 3($\alpha$),20-dihydroxy-20-cyano-21-acetoxy-11-keto-pregnane (Compound 9); dec. 175–185° C.

A solution of 0.60 g. of chromic acid in 1.2 cc. of water and 11 cc. of acetic acid is added to a solution containing about 1.2 g. of 3($\alpha$),20-dihydroxy-20-cyano-21-acetoxy-11-keto-pregnane at room temperature. After 1 hour, water is added and the product which precipitates, is filtered and recrystallized from ethyl acetate to produce 3,11-diketo-20-hydroxy-20-cyano-21-acetoxy-pregnane (Compound 10); dec. 214–217° C.

0.40 cc. of phosphorus oxychloride is added to a solution containing about 950 mg. of 3,11-diketo-20-hydroxy-20-cyano-21-acetoxy-pregnane gives one main constituent, namely $\Delta^{17}$-3,11-diketo-20-cyano-21-acetoxy-pregnene (Compound 11); M. P. 189–190° C.

This compound is further identified by hydrolysis to the corresponding 21-hydroxy derivative, without affecting the cyano grouping. About 150 mg. of the $\Delta^{17}$-3,11-diketo-20-cyano-21-acetoxy-pregnene (Compound 11) is dissolved in 5 cc. of methanol, and a solution containing 200 mg. of potassium carbonate in 2 cc. of water added thereto. The resulting solution is maintained at approximately 50° C. for fifteen minutes, the methanol is evaporated in vacuo, and the crystalline product, which precipitates, recovered by filtration. Recrystallization of this material from ethyl acetate gives substantially pure $\Delta^{17}$-3,11-diketo-20-cyano-21-hydroxy-pregnene (Compound 20); M. P. 263–265° C.

Example 3

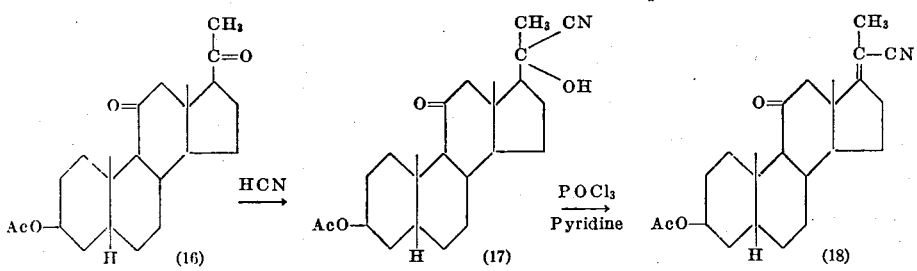

About 1.70 g. of 3($\alpha$)-acetoxy-11,20-diketopregnane (Compound 16) which can be prepared as shown by Von Euw, Lardon and Reichstein in Helv. Chim. Acta 27, 821 (1944) is dissolved in a mixture of 25 cc. of alcohol and 6.4 cc. of acetic acid and the solution is treated at 0° C. with 6.0 g. of potassium cyanide. The solution is allowed to warm to room temperature and after three hours, is diluted with water and the material which precipitates recovered by filtration. The 3($\alpha$)-acetoxy-20-hydroxy-20-cyano-11-ketopregnane (Compound 17), thus obtained, may be purified by recrystallization from ethyl acetate. It decomposes at about 221–223° C. Yield approximately 90% of theory.

To a solution of 293 mg. of 3(α)-acetoxy-20-hydroxy-20-cyano-11-keto-pregnane in 1.0 cc. of dry pyridine is added 0.10 cc. of phosphorus oxychloride. After standing at room temperature for 24 hours, the solution is poured into water and dilute hydrochloric acid, extracted with benzene and the benzene extract concentrated to dryness. The crystalline residue consists of a mixture of unsaturated nitriles which may be separated chromatographically to produce Δ¹⁷-3(α)-acetoxy-11-keto-20-cyano-pregnene (Compound 18); M. P. 194–195° C.

nane in about 8 cc. of dry pyridine is added approximately 1.2 cc. of phosphorus oxychloride. After standing at room temperature for 24 hours, the reaction solution is poured into water and dilute hydrochloric acid. The resulting aqueous mixture is extracted with benzene and the benzene extract is evaporated to produce approximately 2.0 g. of an oil. This oil is subjected to chromatographic separation and the portions which are eluted, employing petroleum ether-ether mixtures, are combined to produce approximately 1.84 g. of crude Δ¹⁷-3(α),21-diacetoxy-11-keto-20-cyano-pregnene which is obtained as an oil.

This oil is saponified by dissolving in a mixture of 10 cc. of benzene and 10 cc. of 1.1 N methanolic

*Example 4*

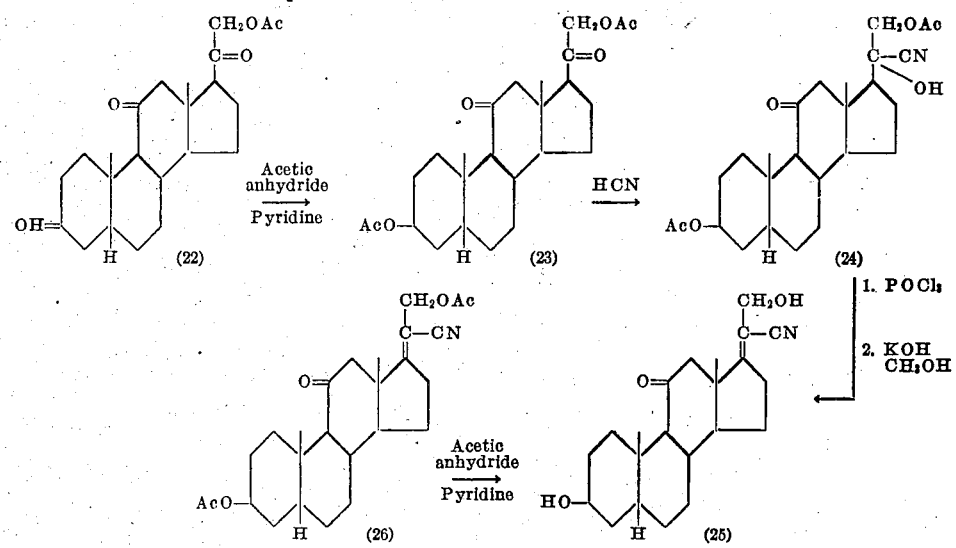

3(α) - hydroxy - 11,20-diketo-21-acetoxy-pregnane (Compound 22) is treated with excess pyridine-acetic anhydride and the mixture warmed on the steam bath for approximately 10 minutes. The resulting solution is diluted with water and extracted with ether. The ethereal extract is washed with dilute hydrochloric acid, dilute sodium carbonate, and finally with water. The ether extract is then evaporated to small volume, and petroleum ether is added thereto to produce crystals of 3(α),21-diacetoxy-11,20-diketo-pregnane (Compound 23); M. P. 100–110° C., which contain 10% of solvent of crystallization. Recrystallization of this material from benzene-petroleum ether gives a product having a dec. point of 82–90° C.

About 3.0 g. of said 3(α),21-diacetoxy-11,20-diketo-pregnane is dissolved in a mixture of 30 cc. of alcohol and 11.4 cc. of acetic acid, and the resulting solution is cooled to 0° C. and treated with about 10.6 g. of potassium cyanide. The mixture is stirred for about one-half hour, and then permitted to warm to room temperature. After two hours, the solution is diluted with water, and the crystalline precipitate thus obtained is filtered and washed. The wet cake is dissolved in ethyl acetate, excess water removed, and the solution is evaporated to small volume in vacuo. Petroleum ether is added to the resulting solution thereby precipitating crystalline 3(α),21-diacetoxy - 11 - keto-20-hydroxy-20-cyano-pregnane (Compound 24); M. P. 143–160° C. with dec.

To a solution of about 2.2 g. of 3(α),21-diacetoxy - 11 - keto - 20-hydroxy-20-cyano-pregpotassium hydroxide. After 10 minutes the solution is acidified with acetic acid, the benzene is evaporated in vacuo, and the residual material crystallized from dilute methanol to produce 1.45 g. of crude product; M. P. 242–254° C. This material is further purified by recrystallization from acetone and from dilute alcohol to produce substantially pure Δ¹⁷-3(α),21-dihydroxy-11-keto-20-cyano-pregnene (Compound 25); M. P. 256–257° C.

This product is treated with excess acetic anhydride and pyridine, at room temperature, to produce substantially pure Δ¹⁷-3(α),21-diacetoxy-11-keto-20-cyano-pregnene (Compound 26).

*Example 5*

About 1.84 g. of crude Δ¹⁷-3(α),21-diacetoxy-11-keto-cyano-pregnene (which can be prepared as described in Example 4), was dissolved in 10 cc. of benzene and treated with 10 cc. of 1.1 N methanolic potassium hydroxide. After standing at room temperature for 10 minutes, the mixture was diluted with water and evaporated to a small volume. The crystalline product which precipitated was recovered by filtration and recrystallized from acetone to produce substantially pure Δ¹⁷-3(α),21-dihydroxy-11-keto-20-cyano-pregnene; M. P. 257° C.

754 mg. of Δ¹⁷-3(α),21-dihydroxy-11-keto-20-cyano-pregnene was dissolved in 2.75 cc. of pyridine and 255 mg. of acetic anhydride was added to the resulting solution. The mixture was allowed to stand for 16 hours at room temperature; the reaction solution was then diluted with water and extracted with ether. The ether solution was washed with dilute aqueous hydrochloric acid, dilute aqueous sodium carbonate, and the washed ether solution was evaporated to small volume. Upon cooling this concentrated solution, the 21-monoacetate precipitated and was recrystallized from benzene to produce substantially pure $\Delta^{17}$-3($a$)-hydroxy-11-keto-20-cyano-21-acetoxy-pregnene; M. P. 153° C.

*Example 6*

1.5 gms. of $\Delta^{17}$-3($a$)-acetoxy-11-keto-20-cyano-pregnene (which can be prepared as described in Example 3) was dissolved in 10 cc. of benzene and the solution was treated with 10 cc. of 1.1 N methanolic potassium hydroxide solution. The resulting mixture was allowed to stand at room temperature for about 8 minutes. The reaction mixture thus obtained was acidified with acetic acid, diluted with water and evaporated to a small volume under reduced pressure. The product which crystallized was recovered by filtration and recrystallized from acetone to produce substantially pure $\Delta^{17}$-3($a$)-hydroxy-11-keto-20-cyano-pregnene; M. P. 182–184° C.

Various changes and modifications may be made in carrying out the present invention without departing from the spirit and scope thereof. Insofar as these changes and modifications are within the purview of the annexed claims, they are to be considered as part of my invention.

I claim:

1. $\Delta^{17}$-20-cyano-pregnenes having a 17-position substituent of the formula: $=C(CN)CH_2R$ wherein R is a radical selected from the class consisting of hydrogen, hydroxy and lower unsubstituted saturated aliphatic monocarboxylic acyloxy radicals, and having at least one nuclear substituent selected from the class consisting of keto, hydroxy and lower unsubstituted saturated aliphatic monocarboxylic acyloxy radicals.

2. $\Delta^{17}$-20-cyano-pregnenes having at least one nuclear hydroxy radical and a 17-position substituent of the formula: $=C(CN)CH_2R_1$ wherein $R_1$ is a lower unsubstituted saturated aliphatic monocarboxylic acyloxy radical.

3. $\Delta^{17}$ - 3($a$) - acetoxy - 11 - keto - 20 – cyano-pregnene.

4. $\Delta^{17}$ - 3($a$),21 - dihydroxy - 11 - keto - 20-cyano-pregnene.

5. $\Delta^{17}$ - 3($a$),21 - diacetoxy - 11 - keto - 20-cyano-pregnene.

6. $\Delta^{17}$ - 3($a$) - hydroxy - 11 - keto - 20 - cyano-21-acetoxy-pregnene.

7. $\Delta^{17}$ - 3,11 - diketo - 20 - cyano - 21 - acetoxy-pregnene.

8. The process of preparing $\Delta^{17}$-pregnene compounds having a cyano substituent attached to the C–20 carbon atom which comprises treating a 20-keto-pregnane compound with hydrogen cyanide and reacting the cyanhydrin thus obtained with a dehydrating agent to produce the corresponding $\Delta^{17}$-20-cyano-pregnene compound.

9. The process which comprises reacting hydrogen cyanide with a 20-keto-pregnane having a 17-position substitutent of the formula: —COCH$_2$R wherein R is a radical selected from the class which consists of hydrogen, hydroxy and acyloxy radicals, and having at least one nuclear substituent selected from the class consisting of keto, hydroxy and acyloxy radicals, and reacting the cyanhydrin thus obtained with an acylating agent followed by a dehydrating agent to produce the corresponding $\Delta^{17}$-20-cyano-pregnene compound having a 17-position substituent of the formula: $=C(CN)CH_2R_1$ wherein $R_1$ is a radical selected from the class which consists of hydrogen and acyloxy radicals, and having at least one nuclear substituent selected from the class consisting of keto and acyloxy radicals.

10. The process which comprises reacting hydrogen cyanide with a 20-keto-pregnane having a 17-position substituent of the formula: —COCH$_2$R wherein R is a radical selected from the class which consists of hydrogen, hydroxy and acyloxy radicals, and having at least one nuclear substituent selected from the class consisting of keto, hydroxy and acyloxy radicals, reacting the cyanhydrin thus obtained with an acylating agent followed by a dehydrating agent to produce the corresponding $\Delta^{17}$-20-cyano-pregnene compound having a 17-position substituent of the formula: $=C(CN)CH_2R_1$ wherein $R_1$ is a radical selected from the class which consists of hydrogen and acyloxy radicals, and having at least one nuclear substituent selected from the class consisting of keto and acyloxy radicals, and hydrolyzing this compound to produce the corresponding $\Delta^{17}$-20-cyano-pregnene compound having a 17-position substituent of the formula: $=C(CN)CH_2R_2$ wherein $R_2$ is a radical selected from the class which consists of hydrogen and hydroxy radicals, and having at least one nuclear substituent selected from the class consisting of keto and hydroxy radicals.

11. The process which comprises reacting hydrogen cyanide with a 20-keto-21-acyloxy-pregnane having at least one nuclear acyloxy radical, reacting the cyanhydrin thus obtained with a dehydrating agent to produce the corresponding $\Delta^{17}$-20-cyano-21-acyloxy-pregnene having at least one nuclear acyloxy radical, reacting this compound with a hydrolyzing agent to produce the corresponding $\Delta^{17}$-20-cyano-21-hydroxy-pregnene having at least one nuclear hydroxy radical, and reacting this compound with approximately one molecular equivalent of an acylating agent thereby preferentially esterifying the hydroxyl grouping attached to the C–21 carbon atom to produce the corresponding $\Delta^{17}$-20-cyano-21-acyloxy-pregnene having at least one nuclear hydroxy radical.

12. The process which comprises reacting a $\Delta^{17}$-20-cyano-21-hydroxy-pregnene having at least one nuclear hydroxy radical with approximately one molecular equivalent of an acylating agent thereby preferentially esterifying the hydroxy grouping attached to the C–21 carbon atom to produce the corresponding $\Delta^{17}$-20-cyano-21-acyloxy-pregnene having at least one nuclear hydroxy radical.

13. The process which comprises reacting 3($a$),21-diacetoxy - 11,20 - diketo-pregnane with hydrogen cyanide, reacting the cyanhydrin thus obtained with phosphorus oxychloride in the presence of pyridine followed by methanolic potassium hydroxide to produce $\Delta^{17}$-3($a$),21-dihydroxy-11-keto-20-cyano-pregnene, and reacting this compound with approximately one molecular equivalent of acetic anhydride to produce $\Delta^{17}$-3($a$)-hydroxy-11-keto- 20 -cyano-21-acetoxy-pregnene.

14. The process which comprises reacting $\Delta^{17}$-3($a$),21 - dihydroxy - 11 -keto-20-cyano-pregnene with approximately one molecular equivalent of acetic anhydride to produce $\Delta^{17}$-3($a$)-hydroxy-11-keto-20-cyano-21-acetoxy-pregnene.

15. The process which comprises reacting 3($a$),21-diacetoxy - 11,20 - diketo-pregnane with hydrogen cyanide and reacting the cyanhydrin thus obtained with phosphorus oxychloride in the presence of pyridine followed by methanolic potassium hydroxide to produce $\Delta^{17}$-3($a$),21-dihydroxy-11-keto-20-cyano-pregnene.

16. The process which comprises reacting 3($a$),21-diacetoxy-11,20-diketo-pregnane with hydrogen cyanide and reacting the cyanhydrin thus obtained with phosphorus oxychloride in the presence of pyridine to produce $\Delta^{17}$-3($a$),21-diacetoxy-11-keto-20-cyano-pregnene.

LEWIS HASTINGS SARETT.

REFERENCES CITED

The following references are of record in the file of this patent:

FOREIGN PATENTS

| Number | Country | Date |
|--------|---------|------|
| 416,007 | Great Britain | Sept. 3, 1934 |